US012249340B2

(12) United States Patent
Valero et al.

(10) Patent No.: US 12,249,340 B2
(45) **Date of Patent: *Mar. 11, 2025**

(54) NOISE FILLING IN MULTICHANNEL AUDIO CODING

(71) Applicant: Fraunhofer-Gesellschaft zur Foerderung der angewandten Forschung e.V., Munich (DE)

(72) Inventors: Maria Luis Valero, Nuremberg (DE); Christian Helmrich, Erlangen (DE); Johannes Hilpert, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,252

(22) Filed: Dec. 21, 2023

(65) Prior Publication Data

US 2024/0127837 A1 Apr. 18, 2024

Related U.S. Application Data

(63) Continuation of application No. 18/146,911, filed on Dec. 27, 2022, now Pat. No. 11,887,611, which is a (Continued)

(30) Foreign Application Priority Data

Jul. 22, 2013 (EP) .................................... 13177356
Oct. 18, 2013 (EP) .................................... 13189450

(51) Int. Cl.
*G10L 19/028* (2013.01)
*G10L 19/008* (2013.01)
(Continued)

(52) U.S. Cl.
CPC .......... *G10L 19/028* (2013.01); *G10L 19/008* (2013.01); *G10L 19/035* (2013.01);
(Continued)

(58) Field of Classification Search
CPC ... G10L 19/028; G10L 19/008; G10L 19/035; H04S 3/008; H04S 2400/01; H04S 2400/03; H04S 2420/03
(Continued)

(56) References Cited

U.S. PATENT DOCUMENTS 5,692,102 A * 11/1997 Pan ...................... G10L 19/028
704/E19.006
7,539,612 B2 5/2009 Thumpudi et al.
(Continued)

FOREIGN PATENT DOCUMENTS

CN 101223821 A 7/2008
CN 101310328 A 11/2008
(Continued)

OTHER PUBLICATIONS

Helmrich, Christian R, et al., "Efficient transform coding of two-channel audio signals by means of complex-valued stereo prediction", Acoustics, Speech and Signal Processing (ICASSP), 2011, IEEE International Conference on, IEEE, XP032000783, DOI: 10.1109/ICASSP.2011.5946449, ISBN: 978-1-4577-0538-0, May 22, 2011, pp. 497-500.

(Continued)

*Primary Examiner* — Vivian C Chin
*Assistant Examiner* — Douglas J Suthers
(74) *Attorney, Agent, or Firm* — PERKINS COIE LLP; Michael A. Glenn

(57) ABSTRACT

In multichannel audio coding, an improved coding efficiency is achieved by the following measure: the noise filling of zero-quantized scale factor bands is performed
(Continued)

using noise filling sources other than artificially generated noise or spectral replica. In particular, the coding efficiency in multichannel audio coding may be rendered more efficient by performing the noise filling based on noise generated using spectral lines from a previous frame of, or a different channel of the current frame of, the multichannel audio signal.

14 Claims, 6 Drawing Sheets

Related U.S. Application Data continuation of application No. 17/217,121, filed on Mar. 30, 2021, now Pat. No. 11,594,235, which is a continuation of application No. 16/594,867, filed on Oct. 7, 2019, now Pat. No. 10,978,084, which is a continuation of application No. 16/277,941, filed on Feb. 15, 2019, now Pat. No. 10,468,042, which is a continuation of application No. 15/002,375, filed on Jan. 20, 2016, now Pat. No. 10,255,924, which is a continuation of application No. PCT/EP2014/065550, filed on Jul. 18, 2014.

(51) Int. Cl.
*G10L 19/035* (2013.01)
*H04S 3/00* (2006.01)

(52) U.S. Cl.
CPC .......... *H04S 3/008* (2013.01); *H04S 2400/01* (2013.01); *H04S 2400/03* (2013.01); *H04S 2420/03* (2013.01)

(58) Field of Classification Search
USPC .............................................. 700/94; 381/22
See application file for complete search history.

(56) References Cited

U.S. PATENT DOCUMENTS

| | | | |
|---|---|---|---|
| 2004/0028125 | A1 | 2/2004 | Sato |
| 2009/0006103 | A1 | 1/2009 | Koishida et al. |
| 2010/0003556 | A1 | 1/2010 | Hartvigsen et al. |
| 2010/0228556 | A1 | 9/2010 | Bahn |
| 2010/0235171 | A1 | 9/2010 | Takagi et al. |
| 2010/0296668 | A1 | 11/2010 | Lee et al. |
| 2011/0015768 | A1 | 1/2011 | Lim et al. |
| 2011/0170711 | A1 | 7/2011 | Rettelbach et al. |
| 2012/0226505 | A1 | 9/2012 | Lin et al. |
| 2013/0013321 | A1 | 1/2013 | Oh et al. |

FOREIGN PATENT DOCUMENTS

| | | | |
|---|---|---|---|
| CN | 101933086 | A | 12/2010 |
| CN | 102089808 | A | 6/2011 |
| CN | 102341846 | A | 2/2012 |
| CN | 102405494 | A | 4/2012 |
| JP | 2002156998 | A | 5/2002 |
| KR | 20070037771 | A | 4/2007 |
| KR | 20080092823 | A | 10/2008 |
| KR | 20120098755 | A | 9/2012 |
| RU | 2011102410 | A | 7/2012 |
| RU | 2011104006 | A | 8/2012 |
| WO | 2005096508 | A1 | 10/2005 |
| WO | 2010003556 | A1 | 1/2010 |
| WO | 2010003565 | A1 | 1/2010 |
| WO | 2011042464 | A1 | 4/2011 |
| WO | 2011114933 | A1 | 9/2011 |
| WO | 2012037515 | A1 | 3/2012 |

OTHER PUBLICATIONS

ISO/IEC, FDIS 23003-3:2011(E), "Information technology—MPEG audio technologies—Part 3: Unified speech and audio coding", ISO/IEC JTC 1/SC 29/WG 11, Sep. 20, 2011.—Part 1 of 3, Part 1 of 3.

ISO/IEC, FDIS 23003-3:2011(E), "Information technology—MPEG audio technologies—Part 3: Unified speech and audio coding", ISO/IEC JTC 1/SC 29/WG 11, Sep. 20, 2011—Part 2 of 3, Part 2 of 3.

ISO/IEC, FDIS 23003-3:2011(E), "Information technology—MPEG audio technologies—Part 3: Unified speech and audio coding", ISO/IEC JTC 1/SC 29/WG 11, Sep. 20, 2011. Part 3 of 3, Part 3 of 3.

ISO/IEC 14496-3, "Information technology—Coding of audio-visual objects/ Part 3: Audio", ISO/IEC 2009, 2009, 1416 pp.

ISO/IEC 23003-3, "Information Technology—MPEG audio technologies—Part 3: Unified Speech and Audio Coding", International Standard, ISO/IEC FDIS 23003-3, Nov. 23, 2011, 286 pp.

Neuendorf, Max, et al., "MPEG Unified Speech and Audio Coding—The ISO/MPEG Standard for High-Efficiency Audio Coding of all Content Types", Audio Engineering Society Convention Paper 8654, Presented at the 132nd Convention—Apr. 26, 2012, pp. 1-22.

Pan, Davis, "A Tutorial on MPEG/Audio Compression", IEEE Multimedia Journal, 12 pp.

Valin, JM, et al., "Defintion of the Opus Audio Codec", IETF, pp. 1-326.

Yang, Dai Tracy, et al., "High-Fidelity Multichannel Audio Coding", EURASIP Book Series on Signal Processing and Communications. Hindawi Publishing Corporation., 2006, pp. 42-50.

* cited by examiner

NOISE FILLING IN MULTICHANNEL AUDIO CODING

CROSS-REFERENCE TO RELATED APPLICATIONS

This application is a continuation of U.S. patent application Ser. No. 18/146,911, filed Dec. 27, 2022, which is a continuation of U.S. patent application Ser. No. 17/217,121, filed Mar. 30, 2021, now U.S. Pat. No. 11,594,235, issued on Feb. 28, 2023, which is a continuation of U.S. Ser. No. 16/594,867, filed Oct. 7, 2019, now U.S. Pat. No. 10,978,084, issued on Apr. 13, 2021, which is a continuation of U.S. patent application Ser. No. 16/277,941, filed Feb. 15, 2019, now U.S. Pat. No. 10,468,042, issued Nov. 5, 2019, which is a continuation of U.S. patent application Ser. No. 15/002,375, filed Jan. 20, 2016, now U.S. Pat. No. 10,255,924, issued on Apr. 9, 2019, which is a continuation of International Application No. PCT/EP2014/065550, filed Jul. 18, 2014, which are incorporated herein by reference in their entirety, and additionally claims priority from European Application No. 13177356.6, filed Jul. 22, 2013, and from European Application No. 13189450.3, filed Oct. 18, 2013, which are also incorporated herein by reference in their entirety.

BACKGROUND OF THE INVENTION

The present application concerns noise filling in multichannel audio coding.

Modern frequency-domain speech/audio coding systems such as the Opus/Celt codec of the IETF [1], MPEG-4 (HE-)AAC [2] or, in particular, MPEG-D xHE-AAC (USAC) [3], offer means to code audio frames using either one long transform—a long block—or eight sequential short transforms-short blocks-depending on the temporal stationarity of the signal. In addition, for low-bitrate coding these schemes provide tools to reconstruct frequency coefficients of a channel using pseudorandom noise or lower-frequency coefficients of the same channel. In xHE-AAC, these tools are known as noise filling and spectral band replication, respectively.

However, for very tonal or transient stereophonic input, noise filling and/or spectral band replication alone limit the achievable coding quality at very low bitrates, mostly since too many spectral coefficients of both channels need to be transmitted explicitly.

Thus, it is the object to provide a concept for performing noise filling in multichannel audio coding which provides for a more efficient coding, especially at very low bitrates.

SUMMARY

An embodiment may have a parametric frequency-domain audio decoder configured to identify first scale factor bands of a spectrum of a first channel of a current frame of a multichannel audio signal, within which all spectral lines are quantized to zero, and second scale factor bands of the spectrum, within which at least one spectral line is quantized to non-zero; fill the spectral lines within a predetermined scale factor band of the first scale factor bands with noise generated using spectral lines of a downmix of a previous frame of the multichannel audio signal, with adjusting a level of the noise using a scale factor of the predetermined scale factor band; dequantize the spectral lines within the second scale factor bands using scale factors of the second scale factor bands; and inverse transform the spectrum obtained from the first scale factor bands filled with the noise the level of which is adjusted using the scale factors of the first scale factor bands, and the second scale factor bands dequantized using the scale factors of the second scale factor bands, so as to obtain a time domain portion of the first channel of the multichannel audio signal.

Another embodiment may have a parametric frequency-domain audio encoder configured to quantize spectral lines of a spectrum of a first channel of a current frame of a multichannel audio signal using preliminary scale factors of scale factor bands within the spectrum; identify first scale factor bands in the spectrum within which all spectral lines are quantized to zero, and second scale factor bands of the spectrum within which at least one spectral line is quantized to non-zero, within a prediction and/or rate control loop, fill the spectral lines within a predetermined scale factor band of the first scale factor bands with noise generated using spectral lines of a downmix of a previous frame of the multichannel audio signal, with adjusting a level of the noise using an actual scale factor of the predetermined scale factor band; and signal the actual scale factor for the predetermined scale factor band instead of the preliminary scale factor.

Another embodiment may have a parametric frequency-domain audio decoder configured to identify first scale factor bands of a spectrum of a first channel of a current frame of a multichannel audio signal, within which all spectral lines are quantized to zero, and second scale factor bands of the spectrum, within which at least one spectral line is quantized to non-zero; fill the spectral lines within a predetermined scale factor band of the first scale factor bands with noise generated using spectral lines of a different channel of the current frame of the multichannel audio signal, with adjusting a level of the noise using a scale factor of the predetermined scale factor band; dequantize the spectral lines within the second scale factor bands using scale factors of the second scale factor bands; and inverse transform the spectrum obtained from the first scale factor bands filled with the noise the level of which is adjusted using the scale factors of the first scale factor bands, and the second scale factor bands dequantized using the scale factors of the second scale factor bands, so as to obtain a time domain portion of the first channel of the multichannel audio signal.

Another embodiment may have a parametric frequency-domain audio encoder configured to quantize spectral lines of a spectrum of a first channel of a current frame of a multichannel audio signal using preliminary scale factors of scale factor bands within the spectrum; identify first scale factor bands in the spectrum within which all spectral lines are quantized to zero, and second scale factor bands of the spectrum within which at least one spectral line is quantized to non-zero, within a prediction and/or rate control loop, fill the spectral lines within a predetermined scale factor band of the first scale factor bands with noise generated using spectral lines of a different channel of the current frame of the multichannel audio signal, with adjusting a level of the noise using an actual scale factor of the predetermined scale factor band; and signal the actual scale factor for the predetermined scale factor band instead of the preliminary scale factor.

According to another embodiment, a parametric frequency-domain audio decoding method may have the steps of: identify first scale factor bands of a spectrum of a first channel of a current frame of a multichannel audio signal, within which all spectral lines are quantized to zero, and second scale factor bands of the spectrum, within which at least one spectral line is quantized to non-zero; fill the spectral lines within a predetermined scale factor band of the first scale factor bands with noise generated using spectral lines of a downmix of a previous frame of the multichannel audio signal, with adjusting a level of the noise using a scale factor of the predetermined scale factor band; dequantize the spectral lines within the second scale factor bands using scale factors of the second scale factor bands; and inverse transform the spectrum obtained from the first scale factor bands filled with the noise the level of which is adjusted using the scale factors of the first scale factor bands, and the second scale factor bands dequantized using the scale factors of the second scale factor bands, so as to obtain a time domain portion of the first channel of the multichannel audio signal.

According to still another embodiment, a parametric frequency-domain audio encoding method may have the steps of: quantize spectral lines of a spectrum of a first channel of a current frame of a multi-channel audio signal using preliminary scale factors of scale factor bands within the spectrum; identify first scale factor bands in the spectrum within which all spectral lines are quantized to zero, and second scale factor bands of the spectrum within which at least one spectral line is quantized to non-zero, within a prediction and/or rate control loop, fill the spectral lines within a predetermined scale factor band of the first scale factor bands with noise generated using spectral lines of a downmix of a previous frame of the multichannel audio signal, with adjusting a level of the noise using an actual scale factor of the predetermined scale factor band; signal the actual scale factor for the predetermined scale factor band instead of the preliminary scale factor.

According to another embodiment, a parametric frequency-domain audio decoding method may have the steps of: identify first scale factor bands of a spectrum of a first channel of a current frame of a multichannel audio signal, within which all spectral lines are quantized to zero, and second scale factor bands of the spectrum, within which at least one spectral line is quantized to non-zero; fill the spectral lines within a predetermined scale factor band of the first scale factor bands with noise generated using spectral lines of a different channel of the current frame of the multichannel audio signal, with adjusting a level of the noise using a scale factor of the predetermined scale factor band; dequantize the spectral lines within the second scale factor bands using scale factors of the second scale factor bands; and inverse transform the spectrum obtained from the first scale factor bands filled with the noise the level of which is adjusted using the scale factors of the first scale factor bands, and the second scale factor bands dequantized using the scale factors of the second scale factor bands, so as to obtain a time domain portion of the first channel of the multichannel audio signal.

According to another embodiment, a parametric frequency-domain audio encoding method may have the steps of: quantize spectral lines of a spectrum of a first channel of a current frame of a multi-channel audio signal using preliminary scale factors of scale factor bands within the spectrum; identify first scale factor bands in the spectrum within which all spectral lines are quantized to zero, and second scale factor bands of the spectrum within which at least one spectral line is quantized to non-zero, within a prediction and/or rate control loop, fill the spectral lines within a predetermined scale factor band of the first scale factor bands with noise generated using spectral lines of a different channel of the current frame of the multichannel audio signal, with adjusting a level of the noise using an actual scale factor of the predetermined scale factor band; signal the actual scale factor for the predetermined scale factor band instead of the preliminary scale factor.

Another embodiment may have a computer program having a program code for performing, when running on a computer, the above parametric frequency-domain audio decoding and encoding methods.

The present application is based on the finding that in multichannel audio coding, an improved coding efficiency may be achieved if the noise filling of zero-quantized scale factor bands of a channel is performed using noise filling sources other than artificially generated noise or spectral replica of the same channel. In particular, the efficiency in multichannel audio coding may be rendered more efficient by performing the noise filling based on noise generated using spectral lines from a previous frame of, or a different channel of the current frame of, the multichannel audio signal.

By using spectrally co-located spectral lines of a previous frame or spectrotemporally co-located spectral lines of other channels of the multichannel audio signal, it is possible to attain a more pleasant quality of the reconstructed multi-channel audio signal, especially at very low bitrates where the encoder's requirement to zero-quantize spectral lines is close to a situation so as to zero-quantize scale factor bands as a whole. Owing to the improved noise filling an encoder may then, with less quality penalty, choose to zero-quantize more scale factor bands, thereby improving the coding efficiency.

In accordance with an embodiment of the present application, the source for performing the noise filling partially overlaps with a source used for performing complex-valued stereo prediction. In particular, the downmix of a previous frame may be used as the source for noise filling and co-used as a source for performing, or at least enhancing, the imaginary part estimation for performing the complex inter-channel prediction.

In accordance with embodiments, an existing multichannel audio codec is extended in a backward-compatible fashion so as to signal, on a frame-by-frame basis, the use of inter-channel noise filling. Specific embodiments outlined below, for example, extend xHE-AAC by a signalization in a backward-compatible manner, with the signalization switching on and off inter-channel noise filling exploiting un-used states of the conditionally coded noise filling parameter.

BRIEF DESCRIPTION OF THE DRAWINGS

Embodiments of the present application are described below with respect to the figures, among which.

DETAILED DESCRIPTION OF THE INVENTION

Figure 1:
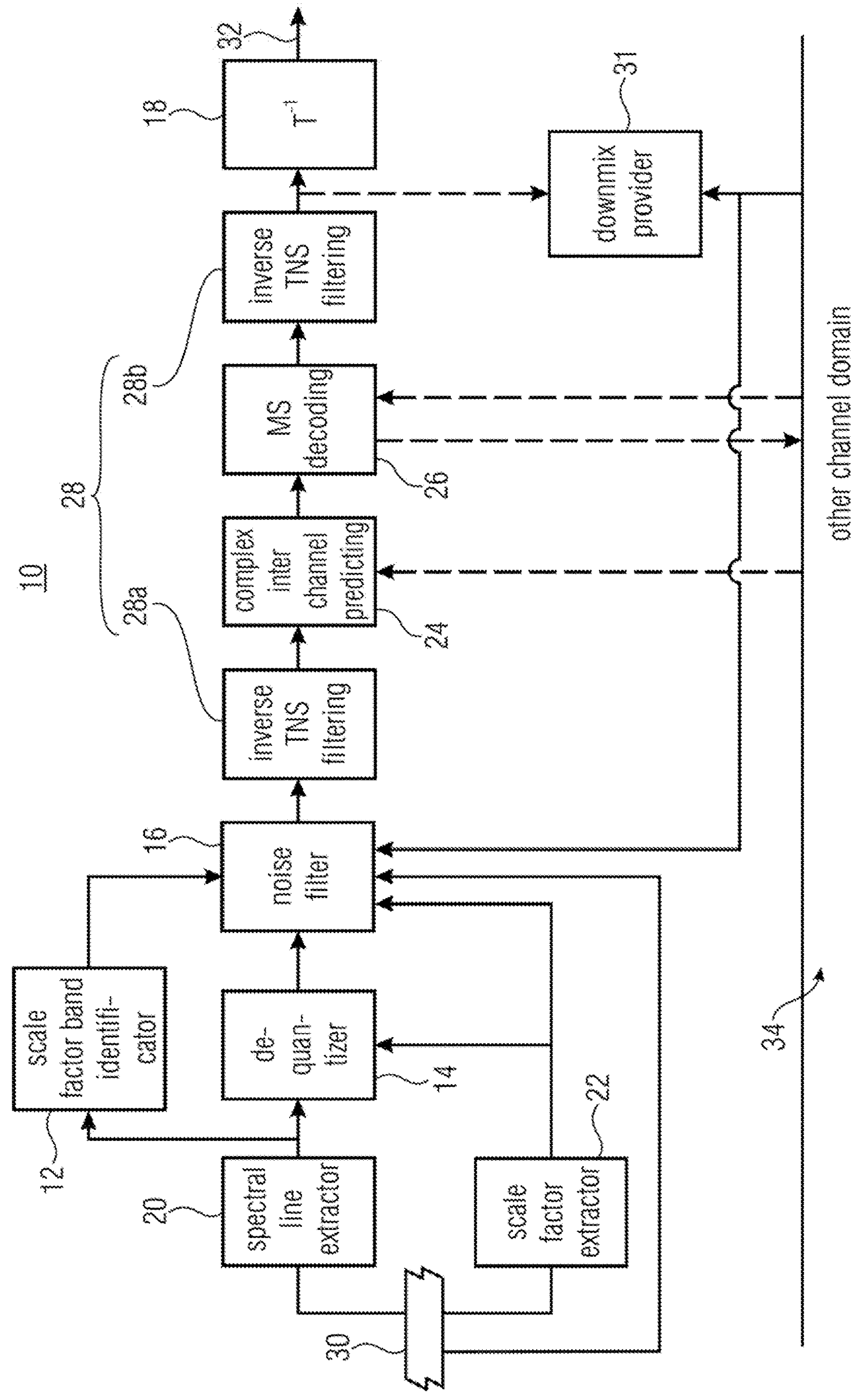
FIG. 1 shows a block diagram of a parametric frequency-domain decoder according to an embodiment of the present application.

FIG. 1 shows a frequency-domain audio decoder in accordance with an embodiment of the present application. The decoder is generally indicated using reference sign 10 and comprises a scale factor band identifier 12, a dequantizer 14, a noise filler 16 and an inverse transformer 18 as well as a spectral line extractor 20 and a scale factor extractor 22. Optional further elements which might be comprised by decoder 10 encompass a complex stereo predictor 24, an MS (mid-side) decoder 26 and an inverse TNS (Temporal Noise Shaping) filter tool of which two instantiations 28*a* and 28*b* are shown in FIG. 1. In addition, a downmix provider is shown and outlined in more detail below using reference sign 31.

The frequency-domain audio decoder 10 of FIG. 1 is a parametric decoder supporting noise filling according to which a certain zero-quantized scale factor band is filled with noise using the scale factor of that scale factor band as a means to control the level of the noise filled into that scale factor band. Beyond this, the decoder 10 of FIG. 1 represents a multichannel audio decoder configured to reconstruct a multichannel audio signal from an inbound data stream 30. FIG. 1, however, concentrates on decoder's 10 elements involved in reconstructing one of the multichannel audio signals coded into data stream 30 and outputs this (output) channel at an output 32. A reference sign 34 indicates that decoder 10 may comprise further elements or may comprise some pipeline operation control responsible for reconstructing the other channels of the multichannel audio signal wherein the description brought forward below indicates how the decoder's 10 reconstruction of the channel of interest at output 32 interacts with the decoding of the other channels.

The multichannel audio signal represented by data stream 30 may comprise two or more channels. In the following, the description of the embodiments of the present application concentrate on the stereo case where the multichannel audio signal merely comprises two channels, but in principle the embodiments brought forward in the following may be readily transferred onto alternative embodiments concerning multichannel audio signals and their coding comprising more than two channels.

As will further become clear from the description of FIG. 1 below, the decoder 10 of FIG. 1 is a transform decoder. That is, according to the coding technique underlying decoder 10, the channels are coded in a transform domain such as using a lapped transform of the channels. Moreover, depending on the creator of the audio signal, there are time phases during which the channels of the audio signal largely represent the same audio content, deviating from each other merely by minor or deterministic changes therebetween, such as different amplitudes and/or phase in order to represent an audio scene where the differences between the channels enable the virtual positioning of an audio source of the audio scene with respect to virtual speaker positions associated with the output channels of the multichannel audio signal. At some other temporal phases, however, the different channels of the audio signal may be more or less uncorrelated to each other and may even represent, for example, completely different audio sources.

In order to account for the possibly time-varying relationship between the channels of the audio signal, the audio codec underlying decoder 10 of FIG. 1 allows for a time-varying use of different measures to exploit inter-channel redundancies. For example, MS coding allows for switching between representing the left and right channels of a stereo audio signal as they are or as a pair of M (mid) and S (side) channels representing the left and right channels' downmix and the halved difference thereof, respectively. That is, there are continuously—in a spectrotemporal sense—spectrograms of two channels transmitted by data stream 30, but the meaning of these (transmitted) channels may change in time and relative to the output channels, respectively.

Complex stereo prediction-another inter-channel redundancy exploitation tool-enables, in the spectral domain, predicting one channel's frequency-domain coefficients or spectral lines using spectrally co-located lines of another channel. More details concerning this are described below.

Figure 2:
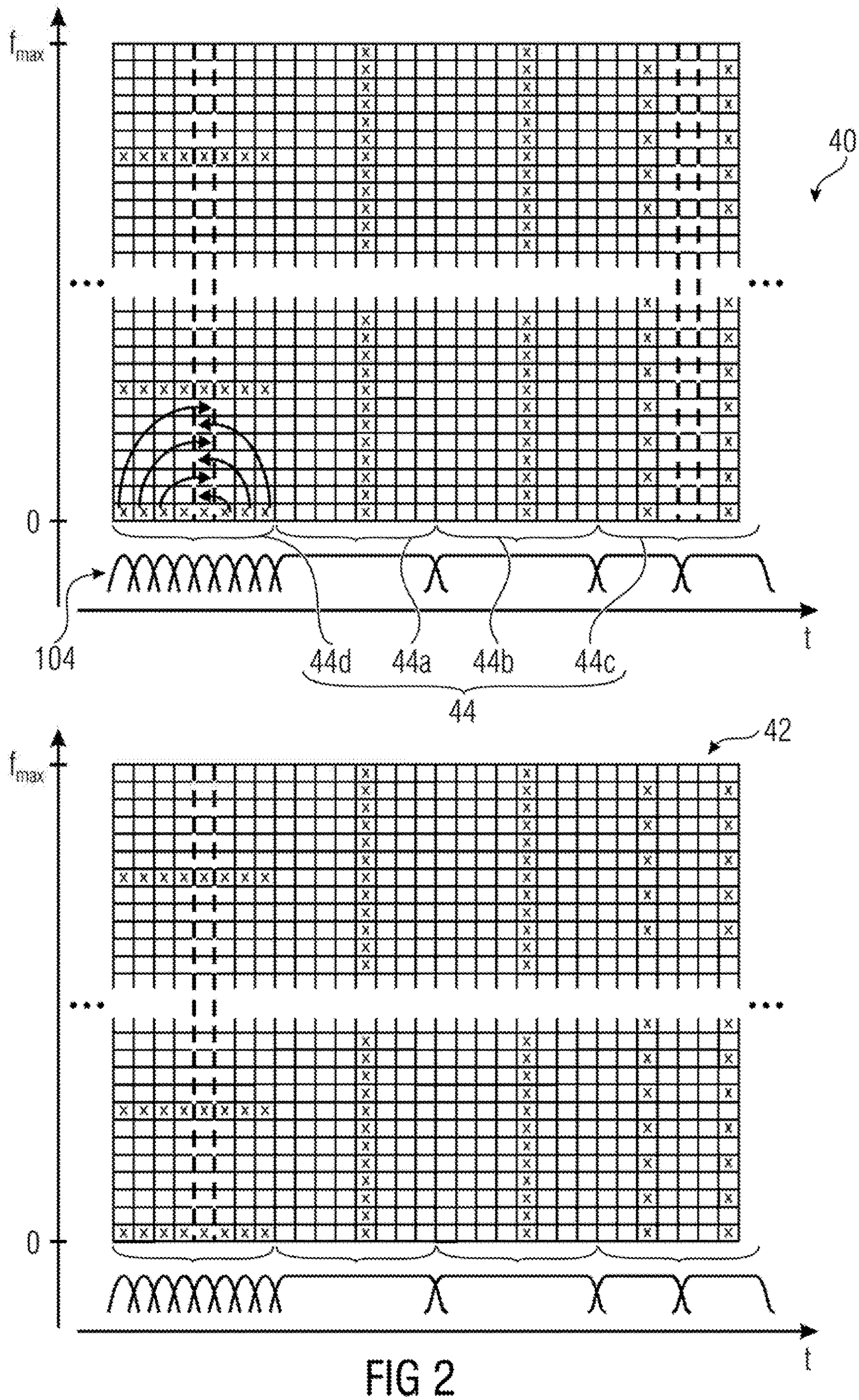
FIG. 2 shows a schematic diagram illustrating the sequence of spectra forming the spectrograms of channels of a multichannel audio signal in order to ease the understanding of the description of the decoder of FIG. 1.

In order to facilitate the understanding of the subsequent description of FIG. 1 and its components shown therein, FIG. 2 shows, for the exemplary case of a stereo audio signal represented by data stream 30, a possible way how sample values for the spectral lines of the two channels might be coded into data stream 30 so as to be processed by decoder 10 of FIG. 1. In particular, while at the upper half of FIG. 2 the spectrogram 40 of a first channel of the stereo audio signal is depicted, the lower half of FIG. 2 illustrates the spectrogram 42 of the other channel of the stereo audio signal. Again, it is worthwhile to note that the "meaning" of spectrograms 40 and 42 may change over time due to, for example, a time-varying switching between an MS coded domain and a non-MS-coded domain. In the first instance, spectrograms 40 and 42 relate to an M and S channel, respectively, whereas in the latter case spectrograms 40 and 42 relate to left and right channels. The switching between MS coded domain and non-coded MS coded domain may be signaled in the data stream 30.

FIG. 2 shows that the spectrograms 40 and 42 may be coded into data stream 30 at a time-varying spectrotemporal resolution. For example, both (transmitted) channels may be, in a time-aligned manner, subdivided into a sequence of frames indicated using curly brackets 44 which may be equally long and abut each other without overlap. As just mentioned, the spectral resolution at which spectrograms 40 and 42 are represented in data stream 30 may change over time. Preliminarily, it is assumed that the spectrotemporal resolution changes in time equally for spectrograms 40 and 42, but an extension of this simplification is also feasible as will become apparent from the following description. The change of the spectrotemporal resolution is, for example, signaled in data stream 30 in units of the frames 44. That is, the spectrotemporal resolution changes in units of frames 44. The change in the spectrotemporal resolution of the spectrograms 40 and 42 is achieved by switching the transform length and the number of transforms used to describe the spectrograms 40 and 42 within each frame 44. In the example of FIG. 2, frames 44*a* and 44*b* exemplify frames where one long transform has been used in order to sample the audio signal's channels therein, thereby resulting in highest spectral resolution with one spectral line sample value per spectral line for each of such frames per channel. In FIG. 2, the sample values of the spectral lines are indicated using small crosses within the boxes, wherein the boxes, in turn, are arranged in rows and columns and shall represent a spectral temporal grid with each row corresponding to one spectral line and each column corresponding to sub-intervals of frames 44 corresponding to the shortest transforms involved in forming spectrograms 40 and 42. In particular, FIG. 2 illustrates, for example, for frame 44*d*, that a frame may alternatively be subject to consecutive transforms of shorter length, thereby resulting, for such frames such as frame 44_d_, in several temporally succeeding spectra of reduced spectral resolution. Eight short transforms are exemplarily used for frame 44_d_, resulting in a spectrotemporal sampling of the spectrograms 40 and 42 within that frame 42_d_, at spectral lines spaced apart from each other so that merely every eighth spectral line is populated, but with a sample value for each of the eight transform windows or transforms of shorter length used to transform frame 44_d_. For illustration purposes, it is shown in FIG. 2 that other numbers of transforms for a frame would be feasible as well, such as the usage of two transforms of a transform length which is, for example, half the transform length of the long transforms for frames 44_a_ and 44_b_, thereby resulting in a sampling of the spectrotemporal grid or spectrograms 40 and 42 where two spectral line sample values are obtained for every second spectral line, one of which relates to the leading transform, the other to the trailing transform.

The transform windows for the transforms into which the frames are subdivided are illustrated in FIG. 2 below each spectrogram using overlapping window-like lines. The temporal overlap serves, for example, for TDAC (Time-Domain Aliasing Cancellation) purposes.

Although the embodiments described further below could also be implemented in another fashion, FIG. 2 illustrates the case where the switching between different spectrotemporal resolutions for the individual frames 44 is performed in a manner such that for each frame 44, the same number of spectral line values indicated by the small crosses in FIG. 2 result for spectrogram 40 and spectrogram 42, the difference merely residing in the way the lines spectrotemporally sample the respective spectrotemporal tile corresponding to the respective frame 44, spanned temporally over the time of the respective frame 44 and spanned spectrally from zero frequency to the maximum frequency $f_{max}$.

Using arrows in FIG. 2, FIG. 2 illustrates with respect to frame 44_d_ that similar spectra may be obtained for all of the frames 44 by suitably distributing the spectral line sample values belonging to the same spectral line but short transform windows within one frame of one channel, onto the un-occupied (empty) spectral lines within that frame up to the next occupied spectral line of that same frame. Such resulting spectra are called "interleaved spectra" in the following. In interleaving n transforms of one frame of one channel, for example, spectrally co-located spectral line values of the n short transforms follow each other before the set of n spectrally co-located spectral line values of the n short transforms of the spectrally succeeding spectral line follows. An intermediate form of interleaving would be feasible as well: instead of interleaving all spectral line coefficients of one frame, it would be feasible to interleave merely the spectral line coefficients of a proper subset of the short transforms of a frame 44_d_. In any case, whenever spectra of frames of the two channels corresponding to spectrograms 40 and 42 are discussed, these spectra may refer to interleaved ones or non-interleaved ones.

Figure 3:
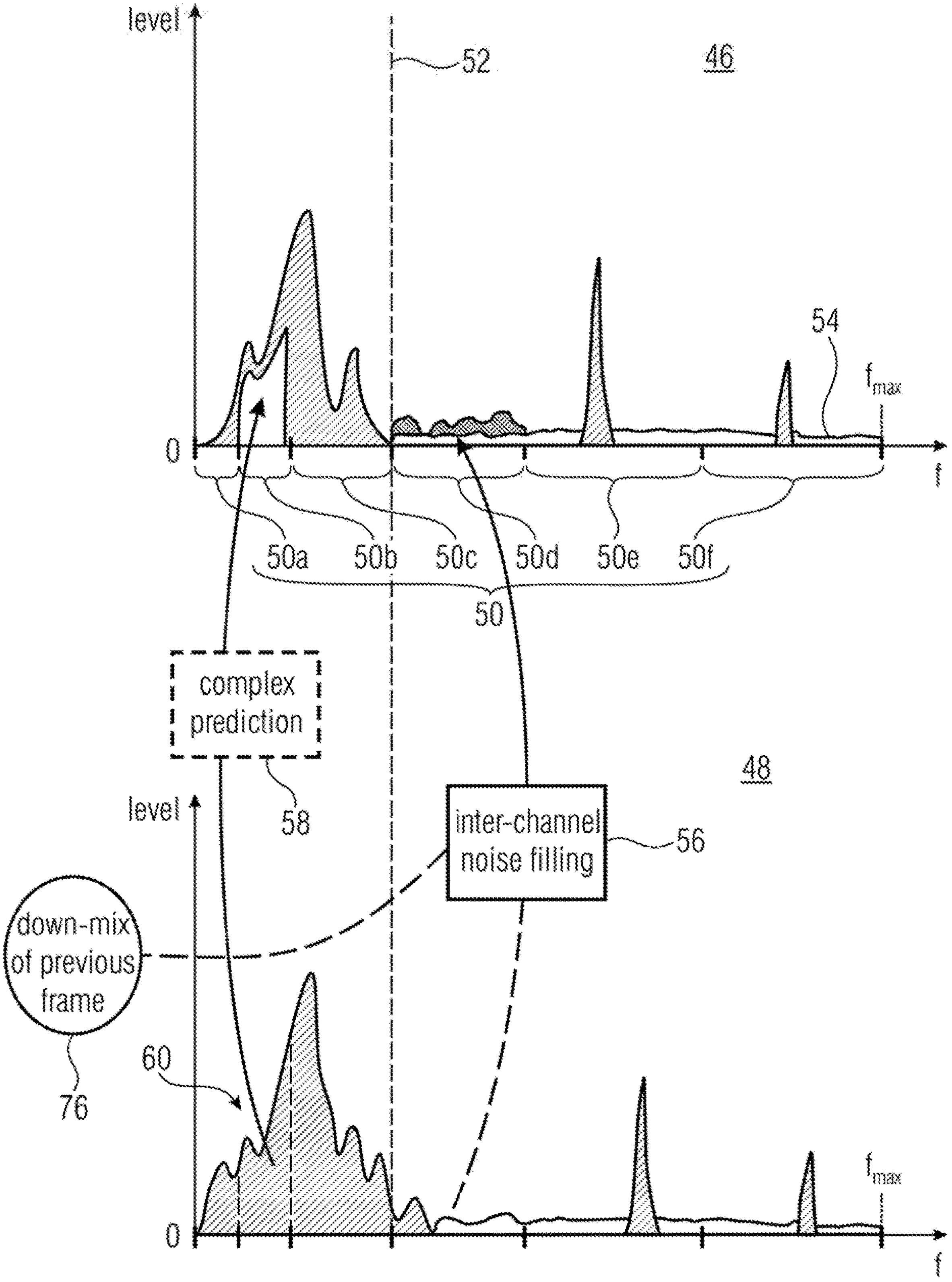
FIG. 3 shows a schematic diagram illustrating current spectra out of the spectrograms shown in FIG. 2 for the sake of alleviating the understanding of the description of FIG. 1.

In order to efficiently code the spectral line coefficients representing the spectrograms 40 and 42 via data stream 30 passed to decoder 10, same are quantized. In order to control the quantization noise spectrotemporally, the quantization step size is controlled via scale factors which are set in a certain spectrotemporal grid. In particular, within each of the sequence of spectra of each spectrogram, the spectral lines are grouped into spectrally consecutive non-overlapping scale factor groups. FIG. 3 shows a spectrum 46 of the spectrogram 40 at the upper half thereof, and a co-temporal spectrum 48 out of spectrogram 42. As shown therein, the spectra 46 and 48 are subdivided into scale factor bands along the spectral axis f so as to group the spectral lines into non-overlapping groups. The scale factor bands are illustrated in FIG. 3 using curly brackets 50. For the sake of simplicity, it is assumed that the boundaries between the scale factor bands coincide between spectrum 46 and 48, but this does not need to necessarily be the case.

That is, by way of the coding in data stream 30, the spectrograms 40 and 42 are each subdivided into a temporal sequence of spectra and each of these spectra is spectrally subdivided into scale factor bands, and for each scale factor band the data stream 30 codes or conveys information about a scale factor corresponding to the respective scale factor band. The spectral line coefficients falling into a respective scale factor band 50 are quantized using the respective scale factor or, as far as decoder 10 is concerned, may be dequantized using the scale factor of the corresponding scale factor band.

Before changing back again to FIG. 1 and the description thereof, it shall be assumed in the following that the specifically treated channel, i.e. the one the decoding of which the specific elements of the decoder of FIG. 1 except 34 are involved with, is the transmitted channel of spectrogram 40 which, as already stated above, may represent one of left and right channels, an M channel or an S channel with the assumption that the multichannel audio signal coded into data stream 30 is a stereo audio signal.

While the spectral line extractor 20 is configured to extract the spectral line data, i.e. the spectral line coefficients for frames 44 from data stream 30, the scale factor extractor 22 is configured to extract for each frame 44 the corresponding scale factors. To this end, extractors 20 and 22 may use entropy decoding. In accordance with an embodiment, the scale factor extractor 22 is configured to sequentially extract the scale factors of, for example, spectrum 46 in FIG. 3, i.e. the scale factors of scale factor bands 50, from the data stream 30 using context-adaptive entropy decoding. The order of the sequential decoding may follow the spectral order defined among the scale factor bands leading, for example, from low frequency to high frequency. The scale factor extractor 22 may use context-adaptive entropy decoding and may determine the context for each scale factor depending on already extracted scale factors in a spectral neighborhood of a currently extracted scale factor, such as depending on the scale factor of the immediately preceding scale factor band. Alternatively, the scale factor extractor 22 may predictively decode the scale factors from the data stream 30 such as, for example, using differential decoding while predicting a currently decoded scale factor based on any of the previously decoded scale factors such as the immediately preceding one. Notably, this process of scale factor extraction is agnostic with respect to a scale factor belonging to a scale factor band populated by zero-quantized spectral lines exclusively, or populated by spectral lines among which at least one is quantized to a non-zero value. A scale factor belonging to a scale factor band populated by zero-quantized spectral lines only may both serve as a prediction basis for a subsequent decoded scale factor which possibly belongs to a scale factor band populated by spectral lines among which one is non-zero, and be predicted based on a previously decoded scale factor which possibly belongs to a scale factor band populated by spectral lines among which one is non-zero.

For the sake of completeness only, it is noted that the spectral line extractor 20 extracts the spectral line coefficients with which the scale factor bands 50 are populated likewise using, for example, entropy coding and/or predictive coding. The entropy coding may use context-adaptivity based on spectral line coefficients in a spectrotemporal neighborhood of a currently decoded spectral line coefficient, and likewise, the prediction may be a spectral prediction, a temporal prediction or a spectrotemporal prediction predicting a currently decoded spectral line coefficient based on previously decoded spectral line coefficients in a spectrotemporal neighborhood thereof. For the sake of an increased coding efficiency, spectral line extractor 20 may be configured to perform the decoding of the spectral lines or line coefficients in tuples, which collect or group spectral lines along the frequency axis.

Thus, at the output of spectral line extractor 20 the spectral line coefficients are provided such as, for example, in units of spectra such as spectrum 46 collecting, for example, all of the spectral line coefficients of a corresponding frame, or alternatively collecting all of the spectral line coefficients of certain short transforms of a corresponding frame. At the output of scale factor extractor 22, in turn, corresponding scale factors of the respective spectra are output.

Scale factor band identifier 12 as well as dequantizer 14 have spectral line inputs coupled to the output of spectral line extractor 20, and dequantizer 14 and noise filler 16 have scale factor inputs coupled to the output of scale factor extractor 22. The scale factor band identifier 12 is configured to identify so-called zero-quantized scale factor bands within a current spectrum 46, i.e. scale factor bands within which all spectral lines are quantized to zero, such as scale factor band 50*c* in FIG. 3, and the remaining scale factor bands of the spectrum within which at least one spectral line is quantized to non-zero. In particular, in FIG. 3 the spectral line coefficients are indicated using hatched areas in FIG. 3. It is visible therefrom that in spectrum 46, all scale factor bands but scale factor band 50*b*—here exemplary 50*a*, 50*c* to 50*f*—have at least one spectral line, the spectral line coefficient of which is quantized to a non-zero value. Later on it will become clear that the zero-quantized scale factor bands such as 50*d* form the subject of the inter-channel noise filling described further below. Before proceeding with the description, it is noted that scale factor band identifier 12 may restrict its identification onto merely a proper subset of the scale factor bands 50 such as onto scale factor bands above a certain start frequency 52. In FIG. 3, this would restrict the identification procedure onto scale factor bands 50*d*, 50*e* and 50*f*.

The scale factor band identifier 12 informs the noise filler 16 on those scale factor bands which are zero-quantized scale factor bands. The dequantizer 14 uses the scale factors associated with an inbound spectrum 46 so as to dequantize, or scale, the spectral line coefficients of the spectral lines of spectrum 46 according to the associated scale factors, i.e. the scale factors associated with the scale factor bands 50. In particular, dequantizer 14 dequantizes and scales spectral line coefficients falling into a respective scale factor band with the scale factor associated with the respective scale factor band. FIG. 3 shall be interpreted as showing the result of the dequantization of the spectral lines.

The noise filler 16 obtains the information on the zero-quantized scale factor bands which form the subject of the following noise filling, the dequantized spectrum as well as the scale factors of at least those scale factor bands identified as zero-quantized scale factor bands and a signalization obtained from data stream 30 for the current frame revealing whether inter-channel noise filling is to be performed for the current frame.

The inter-channel noise filling process described in the following example actually involves two types of noise filling, namely the insertion of a noise floor 54 pertaining to all spectral lines having been quantized to zero irrespective of their potential membership to any zero-quantized scale factor band, and the actual inter-channel noise filling procedure. Although this combination is described hereinafter, it is to be emphasized that the noise floor insertion may be omitted in accordance with an alternative embodiment. Moreover, the signalization concerning the noise filling switch-on and switch-off relating to the current frame and obtained from data stream 30 could relate to the inter-channel noise filling only, or could control the combination of both noise filling sorts together.

As far as the noise floor insertion is concerned, noise filler 16 could operate as follows. In particular, noise filler 16 could employ artificial noise generation such as a pseudorandom number generator or some other source of randomness in order to fill spectral lines, the spectral line coefficients of which were zero. The level of the noise floor 54 thus inserted at the zero-quantized spectral lines could be set according to an explicit signaling within data stream 30 for the current frame or the current spectrum 46. The "level" of noise floor 54 could be determined using a root-mean-square (RMS) or energy measure for example.

The noise floor insertion thus represents a kind of pre-filling for those scale factor bands having been identified as zero-quantized ones such as scale factor band 50*d* in FIG. 3. It also affects other scale factor bands beyond the zero-quantized ones, but the latter are further subject to the following inter-channel noise filling. As described below, the inter-channel noise filling process is to fill-up zero-quantized scale factor bands up to a level which is controlled via the scale factor of the respective zero-quantized scale factor band. The latter may be directly used to this end due to all spectral lines of the respective zero-quantized scale factor band being quantized to zero. Nevertheless, data stream 30 may contain an additional signalization of a parameter, for each frame or each spectrum 46, which commonly applies to the scale factors of all zero-quantized scale factor bands of the corresponding frame or spectrum 46 and results, when applied onto the scale factors of the zero-quantized scale factor bands by the noise filler 16, in a respective fill-up level which is individual for the zero-quantized scale factor bands. That is, noise filler 16 may modify, using the same modification function, for each zero-quantized scale factor band of spectrum 46, the scale factor of the respective scale factor band using the just mentioned parameter contained in data stream 30 for that spectrum 46 of the current frame so as to obtain a fill-up target level for the respective zero-quantized scale factor band measuring, in terms of energy or RMS, for example, the level up to which the inter-channel noise filling process shall fill up the respective zero-quantized scale factor band with (optionally) additional noise (in addition to the noise floor 54).

In particular, in order to perform the inter-channel noise filling 56, noise filler 16 obtains a spectrally co-located portion of the other channel's spectrum 48, in a state already largely or fully decoded, and copies the obtained portion of spectrum 48 into the zero-quantized scale factor band to which this portion was spectrally co-located, scaled in such a manner that the resulting overall noise level within that zero-quantized scale factor band-derived by an integration over the spectral lines of the respective scale factor band-equals the aforementioned fill-up target level obtained from the zero-quantized scale factor band's scale factor. By this measure, the tonality of the noise filled into the respective zero-quantized scale factor band is improved in comparison to artificially generated noise such as the one forming the basis of the noise floor 54, and is also better than an uncontrolled spectral copying/replication from very-low-frequency lines within the same spectrum 46.

To be even more precise, the noise filler 16 locates, for a current band such as 50*d*, a spectrally co-located portion within spectrum 48 of the other channel, scales the spectral lines thereof depending on the scale factor of the zero-quantized scale factor band 50*d* in a manner just described involving, optionally, some additional offset or noise factor parameter contained in data stream 30 for the current frame or spectrum 46, so that the result thereof fills up the respective zero-quantized scale factor band 50*d* up to the desired level as defined by the scale factor of the zero-quantized scale factor band 50*d*. In the present embodiment, this means that the filling-up is done in an additive manner relative to the noise floor 54.

In accordance with a simplified embodiment, the resulting noise-filled spectrum 46 would directly be input into the input of inverse transformer 18 so as to obtain, for each transform window to which the spectral line coefficients of spectrum 46 belong, a time-domain portion of the respective channel audio time-signal, whereupon (not shown in FIG. 1) an overlap-add process may combine these time-domain portions. That is, if spectrum 46 is a non-interleaved spectrum, the spectral line coefficients of which merely belong to one transform, then inverse transformer 18 subjects that transform so as to result in one time-domain portion and the preceding and trailing ends of which would be subject to an overlap-add process with preceding and trailing time-domain portions obtained by inverse transforming preceding and succeeding inverse transforms so as to realize, for example, time-domain aliasing cancelation. If, however, the spectrum 46 has interleaved there-into spectral line coefficients of more than one consecutive transform, then inverse transformer 18 would subject same to separate inverse transformations so as to obtain one time-domain portion per inverse transformation, and in accordance with the temporal order defined thereamong, these time-domain portions would be subject to an overlap-add process therebetween, as well as with respect to preceding and succeeding time-domain portions of other spectra or frames.

However, for the sake of completeness it is noted that further processing may be performed onto the noise-filled spectrum. As shown in FIG. 1, the inverse TNS filter may perform an inverse TNS filtering onto the noise-filled spectrum. That is, controlled via TNS filter coefficients for the current frame or spectrum 46, the spectrum obtained so far is subject to a linear filtering along spectral direction.

With or without inverse TNS filtering, complex stereo predictor 24 could then treat the spectrum as a prediction residual of an inter-channel prediction. More specifically, inter-channel predictor 24 could use a spectrally co-located portion of the other channel to predict the spectrum 46 or at least a subset of the scale factor bands 50 thereof. The complex prediction process is illustrated in FIG. 3 with dashed box 58 in relation to scale factor band 50*b*. That is, data stream 30 may contain inter-channel prediction parameters controlling, for example, which of the scale factor bands 50 shall be inter-channel predicted and which shall not be predicted in such a manner. Further, the inter-channel prediction parameters in data stream 30 may further comprise complex inter-channel prediction factors applied by inter-channel predictor 24 so as to obtain the inter-channel prediction result. These factors may be contained in data stream 30 individually for each scale factor band, or alternatively each group of one or more scale factor bands, for which inter-channel prediction is activated or signaled to be activated in data stream 30.

The source of inter-channel prediction may, as indicated in FIG. 3, be the spectrum 48 of the other channel. To be more precise, the source of inter-channel prediction may be the spectrally co-located portion of spectrum 48, co-located to the scale factor band 50*b* to be inter-channel predicted, extended by an estimation of its imaginary part. The estimation of the imaginary part may be performed based on the spectrally co-located portion 60 of spectrum 48 itself, and/or may use a downmix of the already decoded channels of the previous frame, i.e. the frame immediately preceding the currently decoded frame to which spectrum 46 belongs. In effect, inter-channel predictor 24 adds to the scale factor bands to be inter-channel predicted such as scale factor band 50*b* in FIG. 3, the prediction signal obtained as just-described.

As already noted in the preceding description, the channel to which spectrum 46 belongs may be an MS coded channel, or may be a loudspeaker related channel, such as a left or right channel of a stereo audio signal. Accordingly, optionally an MS decoder 26 subjects the optionally inter-channel predicted spectrum 46 to MS decoding, in that same performs, per spectral line or spectrum 46, an addition or subtraction with spectrally corresponding spectral lines of the other channel corresponding to spectrum 48. For example, although not shown in FIG. 1, spectrum 48 as shown in FIG. 3 has been obtained by way of portion 34 of decoder 10 in a manner analogous to the description brought forward above with respect to the channel to which spectrum 46 belongs, and the MS decoding module 26, in performing MS decoding, subjects the spectra 46 and 48 to spectral line-wise addition or spectral line-wise subtraction, with both spectra 46 and 48 being at the same stage within the processing line, meaning, both have just been obtained by inter-channel prediction, for example, or both have just been obtained by noise filling or inverse TNS filtering.

It is noted that, optionally, the MS decoding may be performed in a manner globally concerning the whole spectrum 46, or being individually activatable by data stream 30 in units of, for example, scale factor bands 50. In other words, MS decoding may be switched on or off using respective signalization in data stream 30 in units of, for example, frames or some finer spectrotemporal resolution such as, for example, individually for the scale factor bands of the spectra 46 and/or 48 of the spectrograms 40 and/or 42, wherein it is assumed that identical boundaries of both channels' scale factor bands are defined.

As illustrated in FIG. 1, the inverse TNS filtering by inverse TNS filter 28 could also be performed after any inter-channel processing such as inter-channel prediction 58 or the MS decoding by MS decoder 26. The performance in front of, or downstream of, the inter-channel processing could be fixed or could be controlled via a respective signalization for each frame in data stream 30 or at some other level of granularity. Wherever inverse TNS filtering is performed, respective TNS filter coefficients present in the data stream for the current spectrum 46 control a TNS filter, i.e. a linear prediction filter running along spectral direction so as to linearly filter the spectrum inbound into the respective inverse TNS filter module 28*a* and/or 28*b*.

Thus, the spectrum 46 arriving at the input of inverse transformer 18 may have been subject to further processing as just described. Again, the above description is not meant to be understood in such a manner that all of these optional tools are to be present either concurrently or not. These tools may be present in decoder 10 partially or collectively.

In any case, the resulting spectrum at the inverse transformer's input represents the final reconstruction of the channel's output signal and forms the basis of the aforementioned downmix for the current frame which serves, as described with respect to the complex prediction 58, as the basis for the potential imaginary part estimation for the next frame to be decoded. It may further serve as the final reconstruction for inter-channel predicting another channel than the one which the elements except 34 in FIG. 1 relate to.

The respective downmix is formed by downmix provider 31 by combining this final spectrum 46 with the respective final version of spectrum 48. The latter entity, i.e. the respective final version of spectrum 48, formed the basis for the complex inter-channel prediction in predictor 24.

Figure 4A:
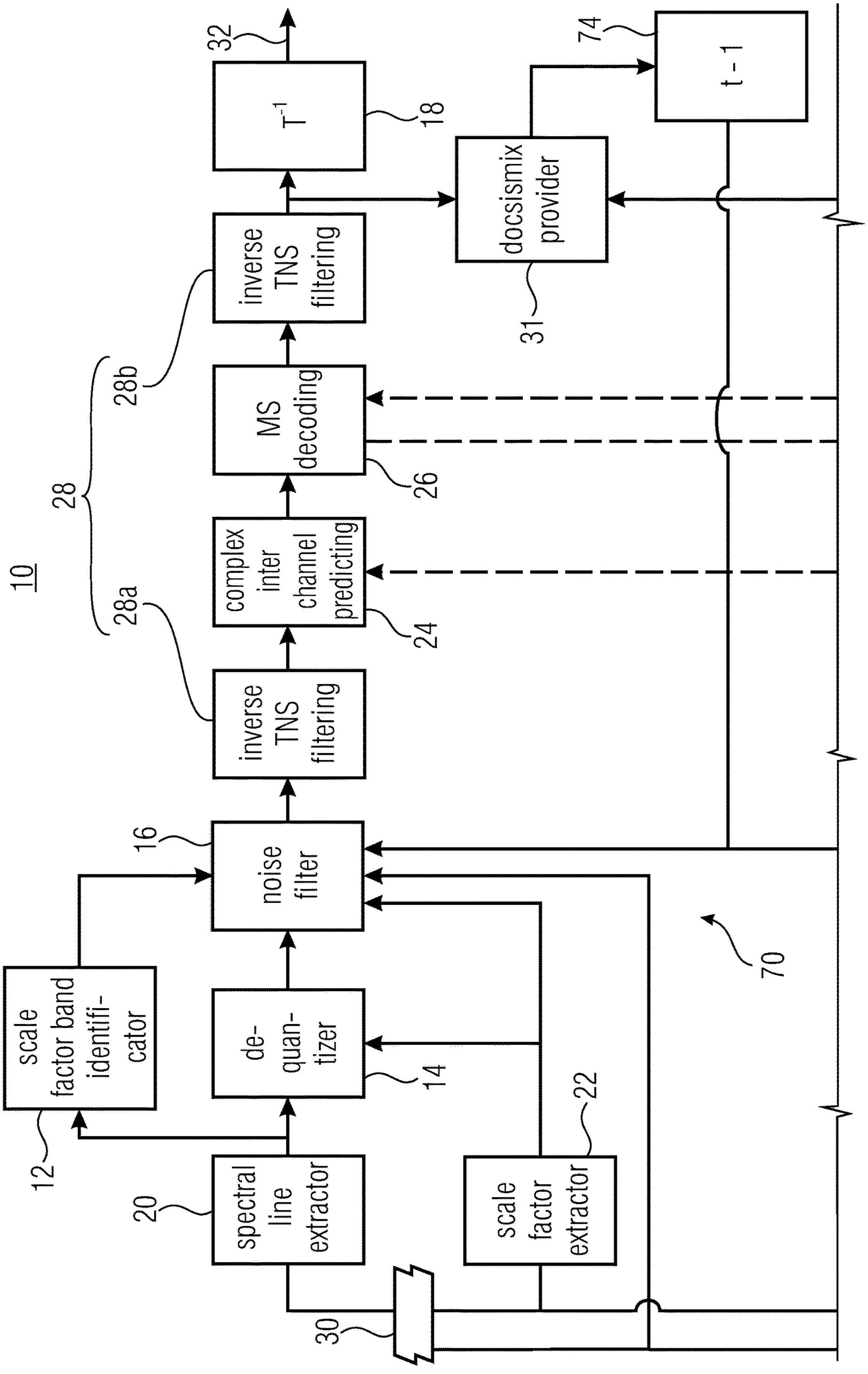
FIG. 4A-B shows a block diagram of a parametric frequency-domain audio decoder in accordance with an alternative embodiment according to which the downmix of the previous frame is used as a basis for inter-channel noise filling.
Figure 4B:
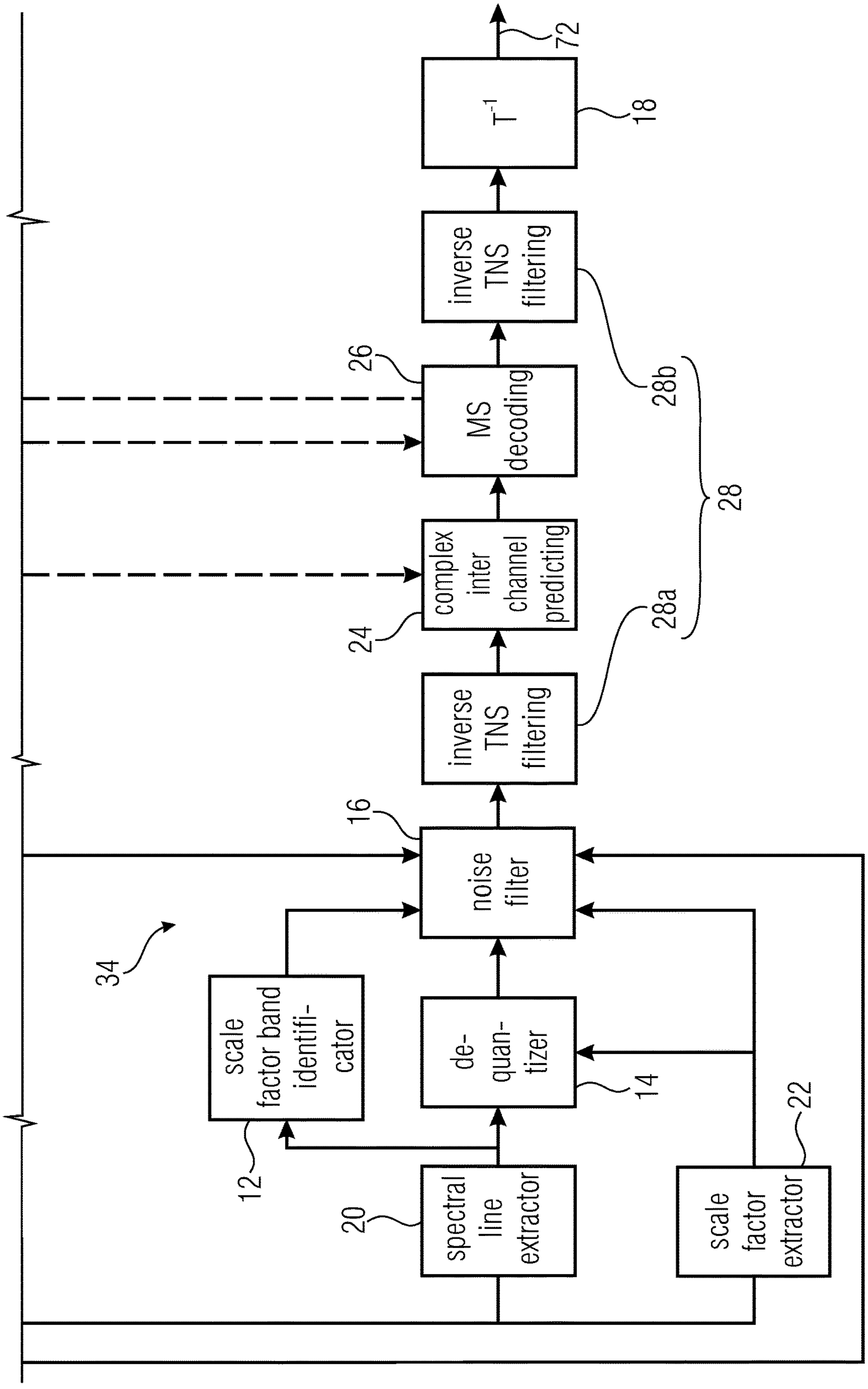

FIG. 4 shows an alternative relative to FIG. 1 insofar as the basis for inter-channel noise filling is represented by the downmix of spectrally co-located spectral lines of a previous frame so that, in the optional case of using complex inter-channel prediction, the source of this complex inter-channel prediction is used twice, as a source for the inter-channel noise filling as well as a source for the imaginary part estimation in the complex inter-channel prediction. FIG. 4 shows a decoder 10 including the portion 70 pertaining to the decoding of the first channel to which spectrum 46 belongs, as well as the internal structure of the aforementioned other portion 34, which is involved in the decoding of the other channel comprising spectrum 48. The same reference sign has been used for the internal elements of portion 70 on the one hand and 34 on the other hand. As can be seen, the construction is the same. At output 32, one channel of the stereo audio signal is output, and at the output 72 of the inverse transformer 18 of second decoder portion 34, the other (output) channel of the stereo audio signal results, with this output being indicated by reference sign 74. Again, the embodiments described above may be easily transferred to a case of using more than two channels.

The downmix provider 31 is co-used by both portions 70 and 34 and receives temporally co-located spectra 48 and 46 of spectrograms 40 and 42 so as to form a downmix based thereon by summing up these spectra on a spectral line by spectral line basis, potentially with forming the average therefrom by dividing the sum at each spectral line by the number of channels downmixed, i.e. two in the case of FIG. 4. At the downmix provider's 31 output, the downmix of the previous frame results by this measure. It is noted in this regard that in case of the previous frame containing more than one spectrum in either one of spectrograms 40 and 42, different possibilities exist as to how downmix provider 31 operates in that case. For example, in that case downmix provider 31 may use the spectrum of the trailing transforms of the current frame, or may use an interleaving result of interleaving all spectral line coefficients of the current frame of spectrogram 40 and 42. The delay element 74 shown in FIG. 4 as connected to the downmix provider's 31 output, shows that the downmix thus provided at downmix provider's 31 output forms the down-mix of the previous frame 76 (see FIG. 3 with respect to the inter-channel noise filling 56 and complex prediction 58, respectively). Thus, the output of delay element 74 is connected to the inputs of inter-channel predictors 24 of decoder portions 34 and 70 on the one hand, and the inputs of noise fillers 16 of decoder portions 70 and 34, on the other hand.

That is, while in FIG. 1, the noise filler 16 receives the other channel's finally reconstructed temporally co-located spectrum 48 of the same current frame as a basis of the inter-channel noise filling, in FIG. 4 the inter-channel noise filling is performed instead based on the downmix of the previous frame as provided by downmix provider 31. The way in which the inter-channel noise filling is performed, remains the same. That is, the inter-channel noise filler 16 grabs out a spectrally co-located portion out of the respective spectrum of the other channel's spectrum of the current frame, in case of FIG. 1, and the largely or fully decoded, final spectrum as obtained from the previous frame representing the downmix of the previous frame, in case of FIG. 4, and adds same "source" portion to the spectral lines within the scale factor band to be noise filled, such as **50*d* in FIG. 3**, scaled according to a target noise level determined by the respective scale factor band's scale factor.

Concluding the above discussion of embodiments describing inter-channel noise filling in an audio decoder, it should be evident to readers skilled in the art that, before adding the grabbed-out spectrally or temporally co-located portion of the "source" spectrum to the spectral lines of the "target" scale factor band, a certain pre-processing may be applied to the "source" spectral lines without digressing from the general concept of the inter-channel filling. In particular, it may be beneficial to apply a filtering operation such as, for example, a spectral flattening, or tilt removal, to the spectral lines of the "source" region to be added to the "target" scale factor band, like **50*d* in FIG. 3**, in order to improve the audio quality of the inter-channel noise filling process. Likewise, and as an example of a largely (instead of fully) decoded spectrum, the aforementioned "source" portion may be obtained from a spectrum which has not yet been filtered by an available inverse (i.e. synthesis) TNS filter.

Thus, the above embodiments concerned a concept of an inter-channel noise filling. In the following, a possibility is described how the above concept of inter-channel noise filling may be built into an existing codec, namely xHE-AAC, in a semi-backward compatible manner. In particular, hereinafter an advantageous implementation of the above embodiments is described, according to which a stereo filling tool is built into an xHE-AAC based audio codec in a semi-backward compatible signaling manner. By use of the implementation described further below, for certain stereo signals, stereo filling of transform coefficients in either one of the two channels in an audio codec based on an MPEG-D xHE-AAC (USAC) is feasible, thereby improving the coding quality of certain audio signals especially at low bitrates. The stereo filling tool is signaled semi-backward-compatibly such that legacy xHE-AAC decoders can parse and decode the bitstreams without obvious audio errors or drop-outs. As was already described above, a better overall quality can be attained if an audio coder can use a combination of previously decoded/quantized coefficients of two stereo channels to reconstruct zero-quantized (non-transmitted) coefficients of either one of the currently decoded channels. It is therefore desirable to allow such stereo filling (from previous to present channel coefficients) in addition to spectral band replication (from low- to high-frequency channel coefficients) and noise filling (from an uncorrelated pseudorandom source) in audio coders, especially xHE-AAC or coders based on it.

To allow coded bitstreams with stereo filling to be read and parsed by legacy xHE-AAC decoders, the desired stereo filling tool shall be used in a semi-backward compatible way: its presence should not cause legacy decoders to stop—or not even start—decoding. Readability of the bitstream by xHE-AAC infrastructure can also facilitate market adoption.

To achieve the aforementioned wish for semi-backward compatibility for a stereo filling tool in the context of xHE-AAC or its potential derivatives, the following implementation involves the functionality of stereo filling as well as the ability to signal the same via syntax in the data stream actually concerned with noise filling. The stereo filling tool would work in line with the above description. In a channel pair with common window configuration, a coefficient of a zero-quantized scale factor band is, when the stereo filling tool is activated, as an alternative (or, as described, in addition) to noise filling, reconstructed by a sum or difference of the previous frame's coefficients in either one of the two channels, advantageously the right channel. Stereo filling is performed similar to noise filling. The signaling would be done via the noise filling signaling of xHE-AAC. Stereo filling is conveyed by means of the 8-bit noise filling side information. This is feasible because the MPEG-D USAC standard [4] states that all 8 bits are transmitted even if the noise level to be applied is zero. In that situation, some of the noise-fill bits can be reused for the stereo filling tool.

Semi-backward-compatibility regarding bitstream parsing and playback by legacy xHE-AAC decoders is ensured as follows. Stereo filling is signaled via a noise level of zero (i.e. the first three noise-fill bits al' having a value of zero) followed by five non-zero bits (which traditionally represent a noise offset) containing side information for the stereo filling tool as well as the missing noise level. Since a legacy xHE-AAC decoder disregards the value of the 5-bit noise offset if the 3-bit noise level is zero, the presence of the stereo filling tool signaling only has an effect on the noise filling in the legacy decoder: noise filling is turned off since the first three bits are zero, and the remainder of the decoding operation runs as intended. In particular, stereo filling is not performed due to the fact that it is operated like the noise-fill process, which is deactivated. Hence, a legacy decoder still offers "graceful" decoding of the enhanced bitstream 30 because it does not need to mute the output signal or even abort the decoding upon reaching a frame with stereo filling switched on. Naturally, it is however unable to provide a correct, intended reconstruction of stereo-filled line coefficients, leading to a deteriorated quality in affected frames in comparison with decoding by an appropriate decoder capable of appropriately dealing with the new stereo filling tool. Nonetheless, assuming the stereo filling tool is used as intended, i.e. only on stereo input at low bitrates, the quality through xHE-AAC decoders should be better than if the affected frames would drop out due to muting or lead to other obvious playback errors.

In the following, a detailed description is presented how a stereo filling tool may be built into, as an extension, the xHE-AAC codec.

When built into the standard, the stereo filling tool could be described as follows. In particular, such a stereo filling (SF) tool would represent a new tool in the frequency-domain (FD) part of MPEG-H 3D-audio. In line with the above discussion, the aim of such a stereo filling tool would be the parametric reconstruction of MDCT spectral coefficients at low bitrates, similar to what already can be achieved with noise filling according to section 7.2 of the standard described in [4]. However, unlike noise filling, which employs a pseudorandom noise source for generating MDCT spectral values of any FD channel, SF would be available also to reconstruct the MDCT values of the right channel of a jointly coded stereo pair of channels using a downmix of the left and right MDCT spectra of the previous frame. SF, in accordance with the implementation set forth below, is signaled semi-backward-compatibly by means of the noise filling side information which can be parsed correctly by a legacy MPEG-D USAC decoder.

The tool description could be as follows. When SF is active in a joint-stereo FD frame, the MDCT coefficients of empty (i.e. fully zero-quantized) scale factor bands of the right (second) channel, such as 50*d*, are replaced by a sum or difference of the corresponding decoded left and right channels' MDCT coefficients of the previous frame (if FD). If legacy noise filling is active for the second channel, pseudorandom values are also added to each coefficient. The resulting coefficients of each scale factor band are then scaled such that the RMS (root of the mean coefficient square) of each band matches the value transmitted by way of that band's scale factor. See section 7.3 of the standard in [4].

Some operational constraints could be provided for the use of the new SF tool in the MPEG-D USAC standard. For example, the SF tool may be available for use only in the right FD channel of a common FD channel pair, i.e. a channel pair element transmitting a StereoCoreToolInfo( ) with common_window==1. Besides, due to the semi-backward-compatible signaling, the SF tool may be available for use only when noiseFilling==1 in the syntax container UsacCoreConfig( ). If either of the channels in the pair is in LPD core_mode, the SF tool may not be used, even if the right channel is in the FD mode.

The following terms and definitions are used hereafter in order to more clearly describe the extension of the standard as described in [4].

In particular, as far as the data elements are concerned, the following data element is newly introduced:

| | |
|---|---|
| stereo_filling | binary flag indicating whether SF is utilized in the current frame and channel |

Further, new help elements are introduced:

| | |
|---|---|
| noise_offset | noise-fill offset to modify the scale factors of zero-quantized bands (section 7.2) |
| noise_level | noise-fill level representing the amplitude of added spectrum noise (section 7.2) |
| downmix_prev[ ] | downmix (i.e. sum or difference) of the previous frame's left and right channels |
| sf_index[g][sfb] | scale factor index (i.e. transmitted integer) for window group g and band sfb |

The decoding process of the standard would be extended in the following manner. In particular, the decoding of a joint-stereo coded FD channel with the SF tool being activated is executed in three sequential steps as follows:

First of all, the decoding of the stereo_filling flag would take place.

stereo_filling does not represent an independent bit-stream element but is derived from the noise-fill elements, noise_offset and noise_level, in a UsacChannelPairElement( ) and the common_window flag in StereoCoreToolInfo( ) If noiseFilling==0 or common_window==0 or the current channel is the left (first) channel in the element, stereo_filling is 0, and the stereo filling process ends. Otherwise,

```
if ((noiseFilling != 0) && (common_window != 0) && (noise_level ==
0)) {
stereo_filling = (noise_offset & 16) / 16;
noise_level = (noise_offset & 14) / 2;
noise_offset = (noise_offset & 1) * 16;
}
else {
stereo_filling = 0;
}
```

In other words, if noise_level==0, noise_offset contains the stereo_filling flag followed by 4 bits of noise filling data, which are then rearranged. Since this operation alters the values of noise_level and noise_offset, it needs to be performed before the noise filling process of section 7.2. Moreover, the above pseudo-code is not executed in the left (first) channel of a UsacChannelPairElement ( ) or any other element.

Then, the calculation of downmix_prev would take place.

downmix_prev[ ], the spectral downmix which is to be used for stereo filling, is identical to the dmx_re_prev[ ] used for the MDST spectrum estimation in complex stereo prediction (section 7.7.2.3). This means that

- All coefficients of downmix_prev[ ] are necessitated to be zero if any of the channels of the frame and element with which the downmixing is performed—i.e. the frame before the currently decoded one—use core_mode==1 (LPD) or the channels use unequal transform lengths (split_transform==1 or block switching to window_sequence==EIGHT_SHORT_SEQUENCE in only one channel) or usacIndependencyFlag==1.
- All coefficients of downmix_prev[ ] are necessitated to be zero during the stereo filling process if the channel's transform length changed from the last to the current frame (i.e. split_transform==1 preceded by split_transform==0, or window_sequence EIGHT_SHORT_SEQUENCE preceded by window_sequence!=EIGHT_SHORT_SEQUENCE, or vice versa resp.) in the current element.
- If transform splitting is applied in the channels of the previous or current frame, downmix_prev[ ] represents a line-by-line interleaved spectral downmix. See the transform splitting tool for details.
- If complex stereo prediction is not utilized in the current frame and element, pred_dir equals 0.

Consequently, the previous downmix only has to be computed once for both tools, saving complexity. The only difference between downmix_prev[ ] and dmx_re_prev[ ] in section 7.7.2 is the behavior when complex stereo prediction is not currently used, or when it is active but use_prev_frame==0. In that case, downmix_prev[ ] is computed for stereo filling decoding according to section 7.7.2.3 even though dmx_re_prev[ ] is not needed for complex stereo prediction decoding and is, therefore, undefined/zero.

Thereinafter, the stereo filling of empty scale factor bands would be performed.

If stereo_filling==1, the following procedure is carried out after the noise filling process in all initially empty scale factor bands sfb[ ] below max_sfb_ste, i.e. all bands in which all MDCT lines were quantized to zero. First, the energies of the given sfb[ ] and the corresponding lines in downmix_prev[ ] are computed via sums of the line squares. Then, given sfbWidth containing the number of lines per sfb[ ],

```
if (energy[sfb] < sfbWidth[sfb]) { /* noise level isn't maximum, or band
starts below noise-fill region */
facDmx = sqrt((sfbWidth[sfb] − energy[sfb]) / energy_dmx[sfb]);
factor = 0.0;
/* if the previous downmix isn't empty, add the scaled downmix lines
such
that band reaches unity energy */
for (index = swb_offset[sfb]; index < swb_offset[sfb+1]; index++) {
spectrum[window][index] += downmix_prev[window][index] * facDmx;
factor += spectrum[window][index] * spectrum[window][index];
}
if ((factor != sfbWidth[sfb]) && (factor > 0)) { /* unity energy isn't
reached, so modify band */
factor = sqrt(sfbWidth[sfb] / (factor + 1e−8));
for (index = swb_offset[sfb]; index < swb_offset[sfb+1]; index++) {
spectrum[window][index] *= factor;
}
}
}
```

for the spectrum of each group window. Then the scale factors are applied onto the resulting spectrum as in section 7.3, with the scale factors of the empty bands being processed like regular scale factors.

An alternative to the above extension of the xHE-AAC standard would use an implicit semi-backward compatible signaling method.

The above implementation in the xHE-AAC code framework describes an approach which employs one bit in a bitstream to signal usage of the new stereo filling tool, contained in stereo_filling, to a decoder in accordance with FIG. 1. More precisely, such signaling (let's call it explicit semi-backward-compatible signaling) allows the following legacy bitstream data—here the noise filling side information—to be used independently of the SF signalization: In the present embodiment, the noise filling data does not depend on the stereo filling information, and vice versa. For example, noise filling data consisting of all-zeros (noise_level=noise_offset=0) may be transmitted while stereo_filling may signal any possible value (being a binary flag, either 0 or 1).

In cases where strict independence between the legacy and the inventive bitstream data is not required and the inventive signal is a binary decision, the explicit transmission of a signaling bit can be avoided, and said binary decision can be signaled by the presence or absence of what may be called implicit semi-backward-compatible signaling. Taking again the above embodiment as an example, the usage of stereo filling could be transmitted by simply employing the new signaling: If noise_level is zero and, at the same time, noise_offset is not zero, the stereo_filling flag is set equal to 1. If both noise_level and noise_offset are not zero, stereo_filling is equal to 0. A dependent of this implicit signal on the legacy noise-fill signal occurs when both noise_level and noise_offset are zero. In this case, it is unclear whether legacy or new SF implicit signaling is being used. To avoid such ambiguity, the value of stereo_filling is defined in advance. In the present example, it is appropriate to define stereo_filling=0 if the noise filling data consists of all-zeros, since this is what legacy encoders without stereo filling capability signal when noise filling is not to be applied in a frame.

The issue which remains to be solved in the case of implicit semi-backward-compatible signaling is how to signal stereo_filling==1 and no noise filling at the same time. As explained, the noise filling data must not be all-zero, and if a noise magnitude of zero is requested, noise_level ((noise_offset & 14)/2 as mentioned above) is necessitated to equal 0. This leaves only a noise_offset ((noise_offset & 1)*16 as mentioned above) greater than 0 as a solution. The noise_offset, however, is considered in case of stereo filling when applying the scale factors, even if noise_level is zero. Fortunately, an encoder can compensate for the fact that a noise_offset of zero might not be transmittable by altering the affected scale factors such that upon bitstream writing, they contain an offset which is undone in the decoder via noise_offset. This allows said implicit signaling in the above embodiment at the cost of a potential increase in scale factor data rate. Hence, the signaling of stereo filling in the pseudo-code of the above description could be changed as follows, using the saved SF signaling bit to transmit noise_offset with 2 bits (4 values) instead of 1 bit:

```
if ((noiseFilling) && (common_window) && (noise_level == 0) &&
(noise_offset > 0)) {
stereo_filling = 1;
noise_level = (noise_offset & 28) / 4;
noise_offset = (noise_offset & 3) * 8;
}
else {
stereo_filling = 0;
}
```

Figure 5:
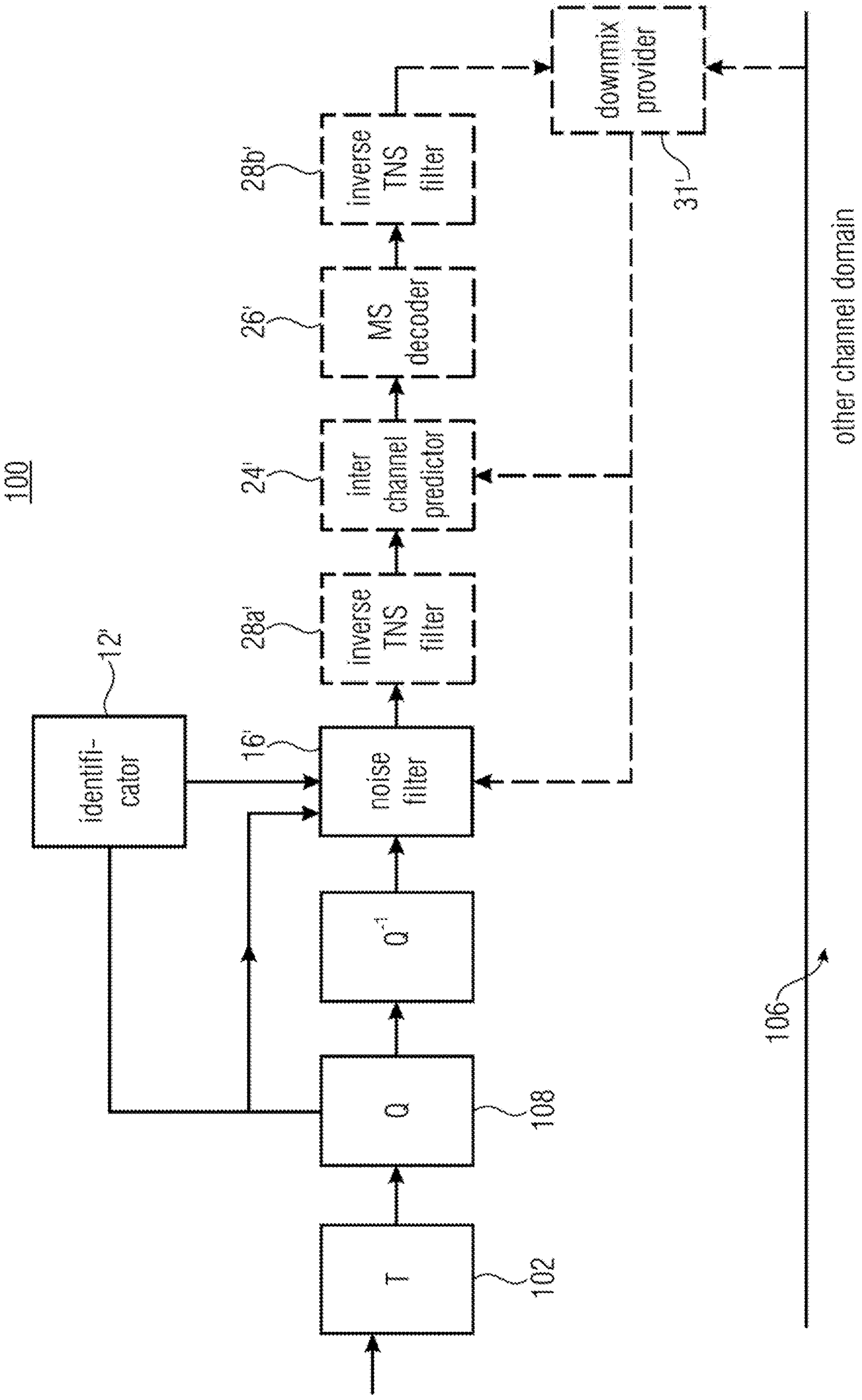
FIG. 5 shows a block diagram of a parametric frequency-domain audio encoder in accordance with an embodiment.

For the sake of completeness, FIG. 5 shows a parametric audio encoder in accordance with an embodiment of the present application. First of all, the encoder of FIG. 5 which is generally indicated using reference sign 100 comprises a transformer 102 for performing the transformation of the original, non-distorted version of the audio signal reconstructed at the output 32 of FIG. 1. As described with respect to FIG. 2, a lapped transform may be used with a switching between different transform lengths with corresponding transform windows in units of frames 44. The different transform length and corresponding transform windows are illustrated in FIG. 2 using reference sign 104. In a manner similar to FIG. 1, FIG. 5 concentrates on a portion of decoder 100 responsible for encoding one channel of the multichannel audio signal, whereas another channel domain portion of decoder 100 is generally indicated using reference sign 106 in FIG. 5.

At the output of transformer 102 the spectral lines and scale factors are unquantized and substantially no coding loss has occurred yet. The spectrogram output by transformer 102 enters a quantizer 108, which is configured to quantize the spectral lines of the spectrogram output by transformer 102, spectrum by spectrum, setting and using preliminary scale factors of the scale factor bands. That is, at the output of quantizer 108, preliminary scale factors and corresponding spectral line coefficients result, and a sequence of a noise filler 16', an optional inverse TNS filter **28*a*', inter-channel predictor 24', MS decoder 26' and inverse TNS filter 28*b*' are sequentially connected so as to provide the encoder 100 of FIG. 5 with the ability to obtain a reconstructed, final version of the current spectrum as obtainable at the decoder side at the downmix provider's input (see FIG. 1). In case of using inter-channel prediction 24' and/or using the inter-channel noise filling in the version forming the inter-channel noise using the downmix of the previous frame, encoder 100 also comprises a downmix provider 31' so as to form a downmix of the reconstructed, final versions of the spectra of the channels of the multi-channel audio signal. Of course, to save computations, instead of the final, the original, unquantized versions of said spectra of the channels may be used by downmix provider 31'** in the formation of the downmix.

The encoder 100 may use the information on the available reconstructed, final version of the spectra in order to perform inter-frame spectral prediction such as the aforementioned possible version of performing inter-channel prediction using an imaginary part estimation, and/or in order to perform rate control, i.e. in order to determine, within a rate control loop, that the possible parameters finally coded into data stream 30 by encoder 100 are set in a rate/distortion optimal sense.

For example, one such parameter set in such a prediction loop and/or rate control loop of encoder 100 is, for each zero-quantized scale factor band identified by identifier 12', the scale factor of the respective scale factor band which has merely been preliminarily set by quantizer 108. In a prediction and/or rate control loop of encoder 100, the scale factor of the zero-quantized scale factor bands is set in some psychoacoustically or rate/distortion optimal sense so as to determine the aforementioned target noise level along with, as described above, an optional modification parameter also conveyed by the data stream for the corresponding frame to the decoder side. It should be noted that this scale factor May be computed using only the spectral lines of the spectrum and channel to which it belongs (i.e. the "target" spectrum, as described earlier) or, alternatively, may be determined using both the spectral lines of the "target" channel spectrum and, in addition, the spectral lines of the other channel spectrum or the downmix spectrum from the previous frame (i.e. the "source" spectrum, as introduced earlier) obtained from downmix provider 31'. In particular to stabilize the target noise level and to reduce temporal level fluctuations in the decoded audio channels onto which the inter-channel noise filling is applied, the target scale factor may be computed using a relation between an energy measure of the spectral lines in the "target" scale factor band, and an energy measure of the co-located spectral lines in the corresponding "source" region. Finally, as noted above, this "source" region may originate from a reconstructed, final version of another channel or the previous frame's downmix, or if the encoder complexity is to be reduced, the original, unquantized version of same other channel or the downmix of original, unquantized versions of the previous frame's spectra.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

A further embodiment includes a parametric frequency-domain audio decoder, configured to identify (12) first scale factor bands of a spectrum of a first channel of a current frame of a multichannel audio signal, within which all spectral lines are quantized to zero, and second scale factor bands of the spectrum, within which at least one spectral line is quantized to non-zero;

fill (16) the spectral lines within a predetermined scale factor band of the first scale factor bands with noise generated using spectral lines of a previous frame of, or a different channel of the current frame of, the multichannel audio signal, with adjusting a level of the noise using a scale factor of the predetermined scale factor band;

dequantize (14) the spectral lines within the second scale factor bands using scale factors of the second scale factor bands; and inverse transform (18) the spectrum obtained from the first scale factor bands filled with the noise the level of which is adjusted using the scale factors of the first scale factor bands, and the second scale factor bands dequantized using the scale factors of the second scale factor bands, so as to obtain a time domain portion of the first channel of the multichannel audio signal.

A further embodiment includes a parametric frequency-domain audio decoder as in the immediately preceding embodiment, further configured to, in the filling, adjust a level of a co-located portion of a spectrum of a downmix of the previous frame, spectrally co-located to the predetermined scale factor band, using the scale factor of the predetermined scale factor band, and add the co-located portion having its level adjusted, to the predetermined scale factor band.

A further embodiment includes a parametric frequency-domain audio decoder as in the immediately preceding embodiment, further configured to predict a subset of the scale factor bands from a different channel or downmix of the current frame to obtain an inter-channel prediction, and use the predetermined scale factor band filled with the noise, and the second scale factor bands dequantized using the scale factors of the second scale factor bands as a prediction residual of the inter-channel prediction to obtain the spectrum.

A further embodiment includes a parametric frequency-domain audio decoder as in the immediately preceding embodiment, further configured to, in predicting the subset of the scale factor bands, perform an imaginary part estimation of the different channel or downmix of the current frame using the spectrum of a downmix of the previous frame.

A further embodiment includes a parametric frequency-domain audio decoder as in any of the immediately preceding embodiments, wherein the current channel and the other channel are subject to MS coding in the data stream, and the parametric frequency-domain audio decoder is configured to subject the spectrum to MS decoding.

A further embodiment includes a parametric frequency-domain audio decoder as in any of the immediately preceding embodiments, further configured to sequentially extract the scale factors of the first and second scale factor bands from a data stream using context-adaptive entropy decoding with context determination depending on, and/or using predictive decoding with spectral prediction depending on, already extracted scale factors in a spectral neighborhood of a currently extracted scale factor, with the scale factors spectrally arranged according to a spectral order among the first and second scale factor bands.

A further embodiment includes a parametric frequency-domain audio decoder as in any of the immediately preceding embodiments, further configured such that the noise is additionally generated using pseudorandom or random noise.

A further embodiment includes a parametric frequency-domain audio decoder as in the immediately preceding embodiment, further configured to adjust a level of the pseudorandom or random noise equally for the first scale factor bands, according to a noise parameter signaled in a data stream for the current frame.

A further embodiment includes a parametric frequency-domain audio decoder as in any of the immediately preceding embodiments, further configured to equally modify the scale factors of the first scale factor bands relative to the scale factors of the second scale factor bands using a modifying parameter signaled in a data stream for the current frame.

A further embodiment includes a parametric frequency-domain audio encoder, configured to quantize spectral lines of a spectrum of a first channel of a current frame of a multichannel audio signal using preliminary scale factors of scale factor bands within the spectrum; identify first scale factor bands in the spectrum within which all spectral lines are quantized to zero, and second scale factor bands of the spectrum within which at least one spectral line is quantized to non-zero, within a prediction and/or rate control loop, fill the spectral lines within a predetermined scale factor band of the first scale factor bands with noise generated using spectral lines of a previous frame of, or a different channel of the current frame of, the multichannel audio signal, with adjusting a level of the noise using an actual scale factor of the predetermined scale factor band; and signal the actual scale factor for the predetermined scale factor band instead of the preliminary scale factor-band.

A further embodiment includes a parametric frequency-domain audio encoder as in the immediately preceding embodiment, further configured to calculate the actual scale factor for the predetermined scale factor band based on a level of an un-quantized version of the spectral lines of the spectrum of the first channel within the predetermined scale factor band and additionally based on the spectral lines of a previous frame of, or a different channel of the current frame of, the multichannel audio signal.

A further embodiment includes a parametric frequency-domain audio decoding method comprising identify first scale factor bands of a spectrum of a first channel of a current frame of a multichannel audio signal, within which all spectral lines are quantized to zero, and second scale factor bands of the spectrum, within which at least one spectral line is quantized to non-zero;

fill the spectral lines within a predetermined scale factor band of the first scale factor bands with noise generated using spectral fines of a previous frame of, or a different channel of the current frame of, the multichannel audio signal, with adjusting a level of the noise using a scale factor of the predetermined scale factor band;

dequantize the spectral lines within the second scale factor bands using scale factors of the second scale factor bands; and inverse transform the spectrum obtained from the first scale factor bands filled with the noise the level of which is adjusted using the scale factors of the first scale factor bands, and the second scale factor bands dequantized using the scale factors of the second scale factor bands, so as to obtain a time domain portion of the first channel of the multichannel audio signal.

A further embodiment includes a parametric frequency-domain audio encoding method comprising quantize spectral lines of a spectrum of a first channel of a current frame of a multi-channel audio signal using preliminary scale factors of scale factor bands within the spectrum;

identify first scale factor bands in the spectrum within which all spectral lines are quantized to zero, and second scale factor bands of the spectrum within which at least one spectral line is quantized to non-zero, within a prediction and/or rate control loop, fill the spectral lines within a predetermined scale factor band of the first scale factor bands with noise generated using spectral lines of a previous frame of, or a different channel of the current frame of, the multi-channel audio signal, with adjusting a level of the noise using an actual scale factor of the predetermined scale factor band; and signal the actual scale factor for the predetermined scale factor band instead of the preliminary scale factor-band.

A further embodiment includes a computer program having a program code for performing, when running on a computer, a method according to any of the two immediately preceding method embodiments.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Internet Engineering Task Force (IETF), RFC 6716, "Definition of the Opus Audio Codec," Int. Standard, September 2012. Available online at http://tools.ietf.org/html/rfc6716.

[2] International Organization for Standardization, ISO/IEC 14496-3:2009, "Information Technology-Coding of audio-visual objects-Part 3: Audio," Geneva, Switzerland, August 2009.

[3] M. Neuendorf et al., "MPEG Unified Speech and Audio Coding—The ISO/MPEG Standard for High-Efficiency Audio Coding of All Content Types," in Proc. $132^{nd}$ AES Convention, Budapest, Hungary, April 2012. Also to appear in the Journal of the AES, 2013.

[4] International Organization for Standardization, ISO/IEC 23003-3:2012, "Information Technology—MPEG audio—Part 3: Unified speech and audio coding," Geneva, January 2012.

What is claimed is:

1. A parametric frequency-domain audio decoder, comprising a microprocessor or electronic circuit configured to, decode, using entropy decoding, from a data stream a first spectrum of a first channel of a current frame of a multichannel audio signal, wherein the first spectrum is subdivided into scale factor bands, and derive from data in the data stream, for each scale factor band, a scale factor associated with the respective scale factor band, check, for a predetermined scale factor band, whether all spectral lines of the first spectrum within the predetermined scale factor band are zero, if all spectral lines within the predetermined scale factor band are zero, fill the first spectrum within the predetermined scale factor band with noise determined from spectral lines of a previous frame of the multichannel audio signal, or a second channel of the current frame of the multichannel audio signal, to obtain a second spectrum;

scale the second spectrum within each scale factor band, including the predetermined scale factor band, using the scale factor of the respective scale factor band to obtain a third spectrum; and subject the third spectrum to an inverse transform to acquire a time domain portion of the first channel of the multichannel audio signal.

2. The parametric frequency-domain audio decoder according to claim 1, wherein the first channel and the second channel are subject to mid-side (MS) coding in the data stream, and the parametric frequency-domain audio decoder is configured to use MS decoding to obtain the first channel and the second channel.

3. The parametric frequency-domain audio decoder according to claim 1 further configured to sequentially decode the scale factors of the scale factor bands from the data stream using context-adaptive entropy decoding by determining a context for decoding a currently decoded scale factor depending on, and/or predicting the currently decoded scale factor depending on already decoded scale factors in a spectral neighborhood of the currently decoded scale factor.

4. The parametric frequency-domain audio decoder according to claim 1, further configured to generate further noise using pseudorandom or random noise, and fill the first spectrum within the predetermined scale factor band further using the further noise.

5. The parametric frequency-domain audio decoder according to claim 4, further configured to decode from the data stream a noise parameter for the current frame, and adjust a level of the pseudorandom or random noise according to the noise parameter.

6. The parametric frequency-domain audio decoder according to claim 1, further configured to determine the noise from spectral lines of a downmix of the previous frame of the multichannel audio signal.

7. A parametric frequency-domain audio encoder, comprising a microprocessor or electronic circuit configured to, encode, using entropy encoding, into a data stream a first spectrum of a first channel of a current frame of a multichannel audio signal, wherein the first spectrum is subdivided into scale factor bands, and insert into the data stream, data from which for each scale factor band, a scale factor associated with the respective scale factor band is derivable, check, for a predetermined scale factor band, whether all spectral lines of the first spectrum within the predetermined scale factor band are zero, if all spectral lines within the predetermined scale factor band are zero, fill the first spectrum within the predetermined scale factor band with noise determined from spectral lines of a previous frame of the first channel of the multichannel audio signal, or a second channel of the current frame of the multichannel audio signal, to obtain a second spectrum, scale the second spectrum within each scale factor band, including the predetermined scale factor band, using the scale factor of the respective scale factor band to obtain a third spectrum; and subject the third spectrum to an inverse transform to acquire a time domain portion of the first channel of the multichannel audio signal.

8. The parametric frequency-domain audio encoder according to claim 7, configured to code the first channel and the second channel into the data stream using mid-side (MS) coding.

9. The parametric frequency-domain audio encoder according to claim 7, further configured to sequentially encode the scale factors of the scale factor bands into the data stream using context-adaptive entropy encoding by determining a context for encoding a currently encoded scale factor depending on, and/or predicting the currently encoded scale factor depending on already encoded scale factors in a spectral neighborhood of the currently encoded scale factor.

10. The parametric frequency-domain audio encoder according to claim 7, further configured to generate further noise using pseudorandom or random noise, and fill the third spectrum within the predetermined scale factor band further using the further noise.

11. The parametric frequency-domain audio encoder according to claim 10, further configured to encode into the data stream a noise parameter for the current frame, and adjust a level of the pseudorandom or random noise according to the noise parameter.

12. The parametric frequency-domain audio encoder according to claim 7, further configured to determine the noise from spectral lines of a downmix of the previous frame of the multichannel audio signal.

13. A parametric frequency-domain audio decoding method comprising decoding, using entropy decoding, from a data stream a first spectrum of a first channel of a current frame of a multichannel audio signal, wherein the first spectrum is subdivided into scale factor bands, and derive from data in the data stream, for each scale factor band, a scale factor associated with the respective scale factor band, checking, for a predetermined scale factor band, whether all spectral lines of the first spectrum within the predetermined scale factor band are zero, responsive to all spectral lines within the predetermined scale factor band being zero, filling the first spectrum within the predetermined scale factor band with noise determined from spectral lines of a previous frame of the multichannel audio signal, or a second channel of the current frame of the multichannel audio signal, to obtain a second spectrum;

scaling the second spectrum within each scale factor band, including the predetermined scale factor band, using the scale factor of the respective scale factor band to obtain a third spectrum; and subjecting the third spectrum to an inverse transform to acquire a time domain portion of the first channel of the multichannel audio signal.

14. A parametric frequency-domain audio encoding method comprising encoding, using entropy coding, into a data stream, a first spectrum of a first channel of a current frame of a multichannel audio signal, wherein the first spectrum is subdivided into scale factor bands, and insert into the data stream, data from which for each scale factor band, a scale factor associated with the respective scale factor band is derivable, checking, for a predetermined scale factor band, whether all spectral lines of the first spectrum within the predetermined scale factor band are zero, responsive to all spectral lines within the predetermined scale factor band being zero, filling the first spectrum within the predetermined scale factor band with noise determined from spectral lines of a previous frame of the first channel of the multichannel audio signal, or a second channel of the current frame of the multichannel audio signal, to obtain a second spectrum;

scaling the second spectrum within each scale factor band, including the predetermined scale factor band, using the scale factor of the respective scale factor band to obtain a third spectrum; and subjecting the third spectrum to an inverse transform to acquire a time domain portion of the first channel of the multichannel audio signal.

* * * * *